(12) United States Patent
Moon et al.

(10) Patent No.: US 9,379,851 B2
(45) Date of Patent: Jun. 28, 2016

(54) METHOD AND APPARATUS FOR TRANSMITTING ACKNOWLEDGEMENT IN WIRELESS COMMUNICATION SYSTEM

(75) Inventors: Sung Ho Moon, Anyang-si (KR); So Yeon Kim, Anyang-si (KR); Han Gyu Cho, Anyang-si (KR); Seung Hee Han, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 13/383,577

(22) PCT Filed: Oct. 20, 2010

(86) PCT No.: PCT/KR2010/007197
§ 371 (c)(1),
(2), (4) Date: Jan. 11, 2012

(87) PCT Pub. No.: WO2011/049368
PCT Pub. Date: Apr. 28, 2011

(65) Prior Publication Data
US 2012/0113945 A1  May 10, 2012

Related U.S. Application Data

(60) Provisional application No. 61/253,486, filed on Oct. 20, 2009.

(51) Int. Cl.
*H04L 1/18* (2006.01)

(52) U.S. Cl.
CPC .................................. *H04L 1/1861* (2013.01)

(58) Field of Classification Search
USPC ........................... 370/254–350; 709/201–213
See application file for complete search history.

(56) References Cited

U.S. PATENT DOCUMENTS

| 8,565,065 | B2 | 10/2013 | Cheng et al. | |
|---|---|---|---|---|
| 8,565,066 | B2 * | 10/2013 | Nam et al. | 370/215 |
| 8,625,509 | B2 * | 1/2014 | Ahn et al. | 370/329 |
| 8,923,223 | B2 * | 12/2014 | Chen et al. | 370/329 |

FOREIGN PATENT DOCUMENTS

| KR | 10-2007-0105287 | 10/2007 |
|---|---|---|
| WO | WO 2009116754 A2 * | 9/2009 |
| WO | WO 2010048178 A1 * | 4/2010 |

OTHER PUBLICATIONS

IP Australia Application Serial No. 2010308705, Notice of Allowance dated May 14, 2014, 2 pages.

(Continued)

*Primary Examiner* — Ayaz Sheikh
*Assistant Examiner* — Debebe Asefa
(74) *Attorney, Agent, or Firm* — Lee, Hong, Degerman, Kang & Walmey; Jonathan Kang; Michael Monaco

(57) ABSTRACT

Provided is a method for transmitting an acknowledgment through a base station in a multi-carrier system. The method for transmitting the acknowledgment through the base station in the multi-carrier system comprises the steps of receiving a plurality of uplink transmission blocks through at least one uplink carrier; determining a downlink channel for transmitting a plurality of ACK/NACK signals corresponding to the transmission blocks on the basis of the at least one uplink carrier; and transmitting the ACK/NACK signals on the determined downlink channel.

10 Claims, 17 Drawing Sheets

(56) References Cited

OTHER PUBLICATIONS

Catt, et al., "Benefits of Carrier Indicator on Multi-Channel ACK/NACK Transmission," 3GPP TSG RAN WG1 Meeting #57bis, R1-092786, Jun. 2009, 3 pages.
Korean Intellectual Property Office Application Serial No. 10-2011-7031651, Notice of Allowance dated Feb. 5, 2014, 2 pages.
Catt et al., "Benefits of Carrier Indicator on Multi-Channel ACK/NACK Transmission", 3GPP TSG RAN WG1 Meeting #57bis, R1-092786, Jun. 2009.
Catt et al., "Design of DL Control Channel for LTE-A with Carrier Aggregation", 3GPP TSG RAN WG1 Meeting #57bis, R1-092785, Jun. 2009.
Panasonic, "Further considerations on PHICH Linkage for carrier aggregation", 3GPP TSG RAN WG1 Meeting #57bis, R1-092534, Jun. 2009.

* cited by examiner

FIG. 5
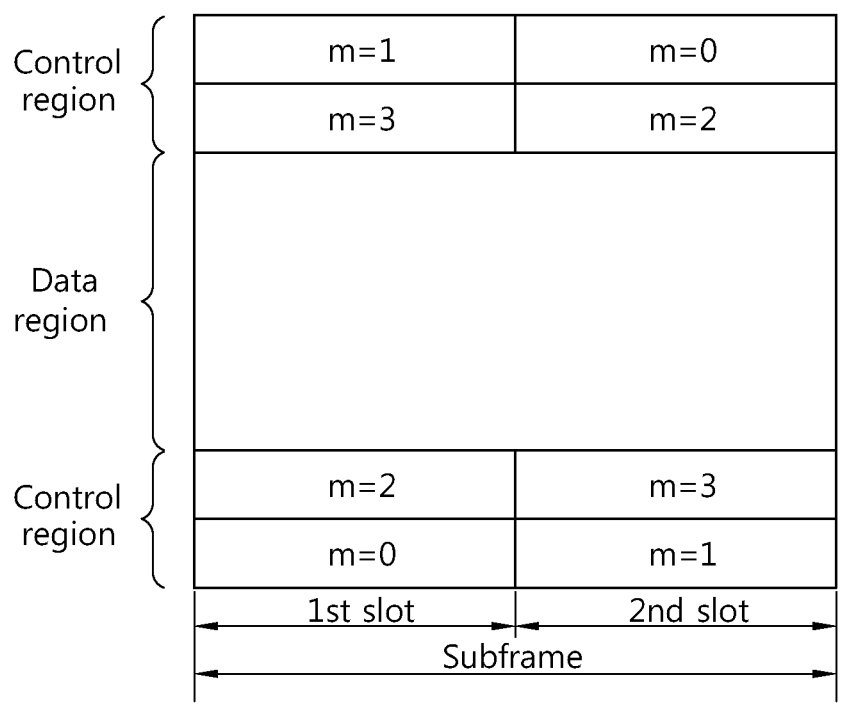
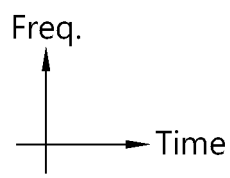

FIG. 8
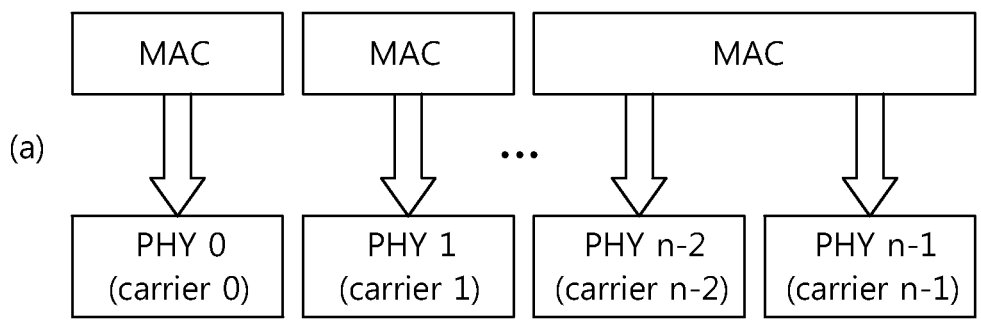
(a)
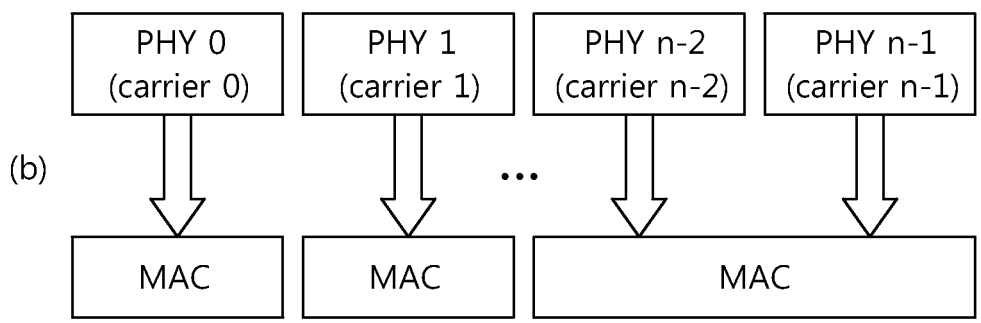
(b)

FIG. 9
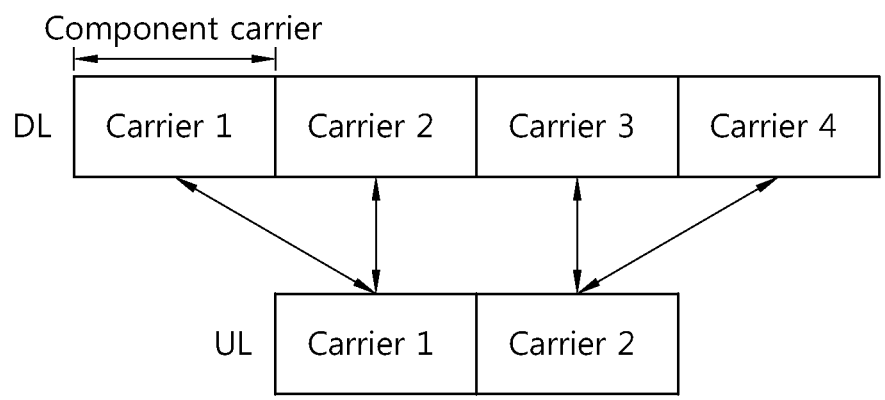
(a) # of DL CC (component carrier) ># of UL CC
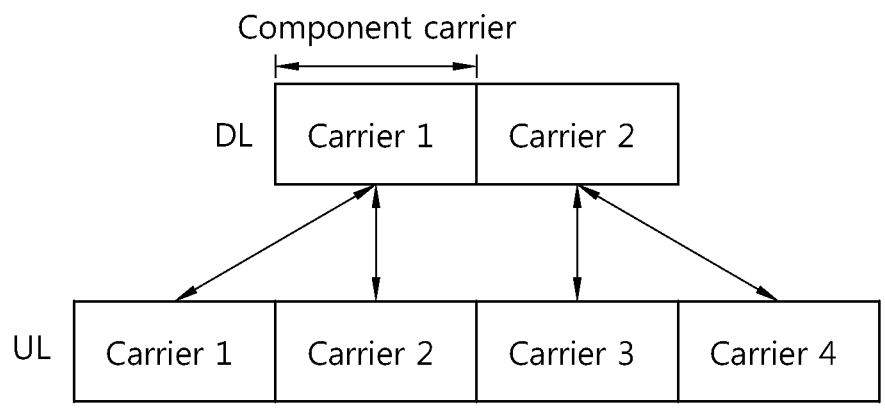
(b) # of UL CC > # of DL CC

METHOD AND APPARATUS FOR TRANSMITTING ACKNOWLEDGEMENT IN WIRELESS COMMUNICATION SYSTEM

CROSS-REFERENCE TO RELATED APPLICATIONS

This application is the National Stage filing under 35 U.S.C. 371 of International Application No. PCT/KR2010/007197, filed on Oct. 20, 2010, which claims the benefit of U.S. Provisional Application Ser. No. 61/253,486, filed on Oct. 20, 2009, the contents of which are all incorporated by reference herein in their entirety.

TECHNICAL FIELD

The present invention relates to wireless communications, and more particularly, to a method and apparatus for transmitting an acknowledgement for a hybrid automatic repeat request (HARQ) in a wireless communication system, and a method and apparatus for receiving the acknowledgement.

BACKGROUND ART

In order to maximize efficiency of limited radio resources, an effective transmission and reception scheme and various methods of utilization thereof have been proposed in a broadband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading. As a result, complexity is decreased in a receiving end and an interval of a transmitted symbol is increased, thereby minimizing the ISI.

In a system using the OFDM as a modulation scheme, orthogonal frequency division multiple access (OFDMA) is a multiple access scheme in which multiple access is achieved by independently providing a part of available subcarrier to each user. In the OFDMA, frequency resources (i.e., subcarriers) are provided to respective users, and the respective frequency resources do not overlap with one another in general since they are independently provided to the multiple users. Consequently, the frequency resources are allocated to the respective users in a mutually exclusive manner. In an OFDMA system, frequency diversity for the multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A multiple input multiple output (MIMO) technique uses multiple transmit antennas and multiple receive antennas to improve data transmission/reception efficiency. Exemplary methods for implementing diversity in a MIMO system include space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc. A MIMO channel matrix depending on the number of receive antennas and the number of transmit antennas can be decomposed into a plurality of independent channels. Each independent channel is referred to as a layer or a stream. The number of layers is referred to as a rank.

As disclosed in the section 6 of 3GPP (3rd generation partnership project) TS 36.211 V8.8.0 (2009-09) "Technical Specification Group Radio Access Network; Evolved Universal Terrestrial Radio Access (E-UTRA); Physical channels and modulation (Release 8)", examples of downlink control channels used in 3GPP LTE include a physical control format indicator channel (PCFICH), a physical downlink control channel (PDCCH), a physical hybrid-ARQ indicator channel (PHICH), etc. The PCFICH transmitted in a first OFDM symbol of a subframe carries information regarding the number of OFDM symbols (i.e., a size of a control region) used for transmission of control channels in the subframe. Control information transmitted through the PDCCH is called downlink control information (DCI). The DCI indicates uplink or downlink scheduling information, an uplink transmit power control command for any UE groups, etc. The PHICH carries an acknowledgement (ACK)/non-acknowledgement (NACK) signal for uplink hybrid automatic repeat request (HARQ). That is, the ACK/NACK signal for uplink data transmitted by a user equipment (UE) is transmitted through the PHICH.

A plurality of PHICHs can be transmitted according to a system environment. In particular, there is a need to transmit the plurality of PHICHs simultaneously in a carrier aggregation system for transmitting data by using a plurality of carriers, a MIMO system, etc. A base station (BS) allocates resources to the plurality of PHICHs, and transmits ACK/NACK through the PHICH.

When considering a cross-scheduling scheme in the carrier aggregation system, there may be a problem in that a plurality of PHICHs are allocated to the same resource when using the conventional method of transmitting ACK/NACK through the PHICH. Accordingly, there is a need to consider an ACK/NACK transmission method capable of solving this problem.

SUMMARY OF INVENTION

Technical Problem

The present invention provides a method and apparatus for a hybrid automatic repeat request (HARQ) operation in a wireless communication system.

Technical Solution

In an aspect, a method for transmitting an acknowledgment by a base station in a multi-carrier system includes receiving a plurality of uplink transport blocks through at least one uplink carrier, determining a downlink channel for transmitting a plurality of acknowledgement (ACK)/non-acknowledgement (NACK) signals for the plurality of transport blocks on the basis of the at least one uplink carrier, and transmitting the plurality of ACK/NACK signals on the determined downlink channel.

The downlink channel may be determined according to the number of at least one uplink carrier.

If a number of uplink carriers is 1, the downlink channel may be configured based on a resource for receiving the uplink transport block.

The downlink channel may be a physical hybrid-ARQ indicator channel (PHICH).

If a number of uplink carriers is a plural number, the downlink channel may be a physical downlink control channel (PDCCH).

The plurality of uplink carriers may be scheduled through one downlink carrier.

If a number of uplink carriers is a plural number, the downlink channel may be allocated to a control channel element (CCE) region for a PDCCH.

In another aspect, a base station includes a radio frequency (RF) unit for transmitting and receiving a radio signal, and a processor, operationally coupled to the RF unit, for transmitting an acknowledgment for a hybrid automatic repeat request (HARQ). The processor is configured for receiving a plurality of uplink transport blocks through at least one uplink carrier, determining a downlink channel for transmitting a plurality of acknowledgement (ACK)/non-acknowledgement (NACK) signals for the plurality of transport blocks on the basis of the at least one uplink carrier, and transmitting the plurality of ACK/NACK signals on the determined downlink channel.

Advantageous Effects

According to the present invention, a plurality of physical hybrid-ARQ indicator channels (PHICHs) can be prevented from being allocated to the same downlink (DL) resource in a wireless communication system using a plurality of carriers by aggregating the carriers, thereby being able to support a reliable hybrid automatic repeat request (HARQ) operation.

In addition, the present invention can solve a problem in that a resource for acknowledgement (ACK)/non-acknowledgement (NACK) signal transmission may not be enough in a carrier aggregation system that requires multiple ACK/NACK signal transmission.

DESCRIPTION OF DRAWINGS

FIG. 5 shows a structure of an uplink (UL) subframe.

FIG. 7 and FIG. 8 show other examples of a base station and a user equipment which constitute a carrier aggregation system.

FIG. 9 shows an example of a DL/UL asymmetric carrier aggregation system to which the present invention is applicable.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, a situation of using an LTE-A system is assumed. However, technical features of the present invention are not limited thereto.

Figure 1:
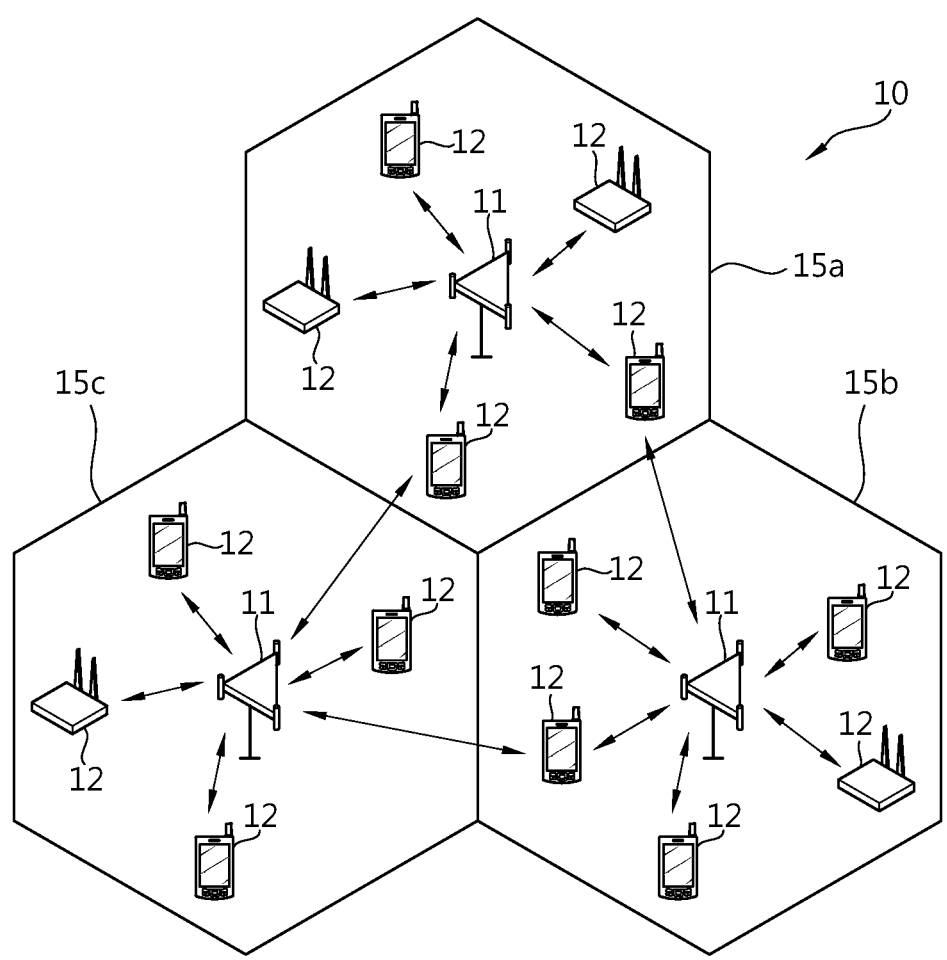
FIG. 1 shows an example of a wireless communication system according to an embodiment of the present invention.

FIG. 1 shows an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service through the serving cell is called a serving BS. Since the wireless communication system is a cellular system, there is a different cell adjacent to the serving cell. The different cell adjacent to the serving cell is called a neighboring cell. A BS that provides a communication service to the adjacent cell is called a neighbor BS. The serving cell and the neighbor cell are determined relatively with respect to the UE.

The technique can be used in a downlink (DL) or an uplink (UL). In general, the DL implies communication from the BS 11 to the UE 12, and the UL implies communication from the UE 12 to the BS 11. In the DL, a transmitter may be a part of the BS 11, and a receiver may be a part of the UE 12. In the UL, the transmitter may be a part of the UE 12, and the receiver may be a part of the BS 11.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

Hereinafter, the transmit antenna denotes a physical or logical antenna used for transmission of one signal or stream. The receive antenna denotes a physical or logical antenna used for reception of one signal or stream.

Figure 2:
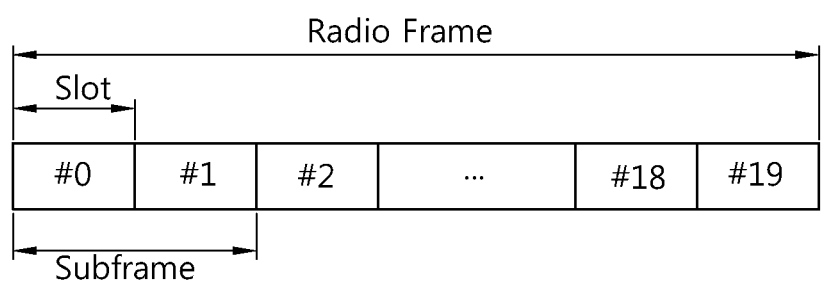
FIG. 2 shows a radio frame structure in $3^{rd}$ generation partnership project (3GPP) long term evolution (LTE).

FIG. 2 shows a radio frame structure in 3GPP LTE.

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. A resource block (RB) is a resource allocation unit, and includes a plurality of consecutive subcarriers in one slot. The above radio frame is shown for exemplary purposes only. Thus, the number of subframes included in the radio frame or the number of slots included in the subframe or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

Figure 3:
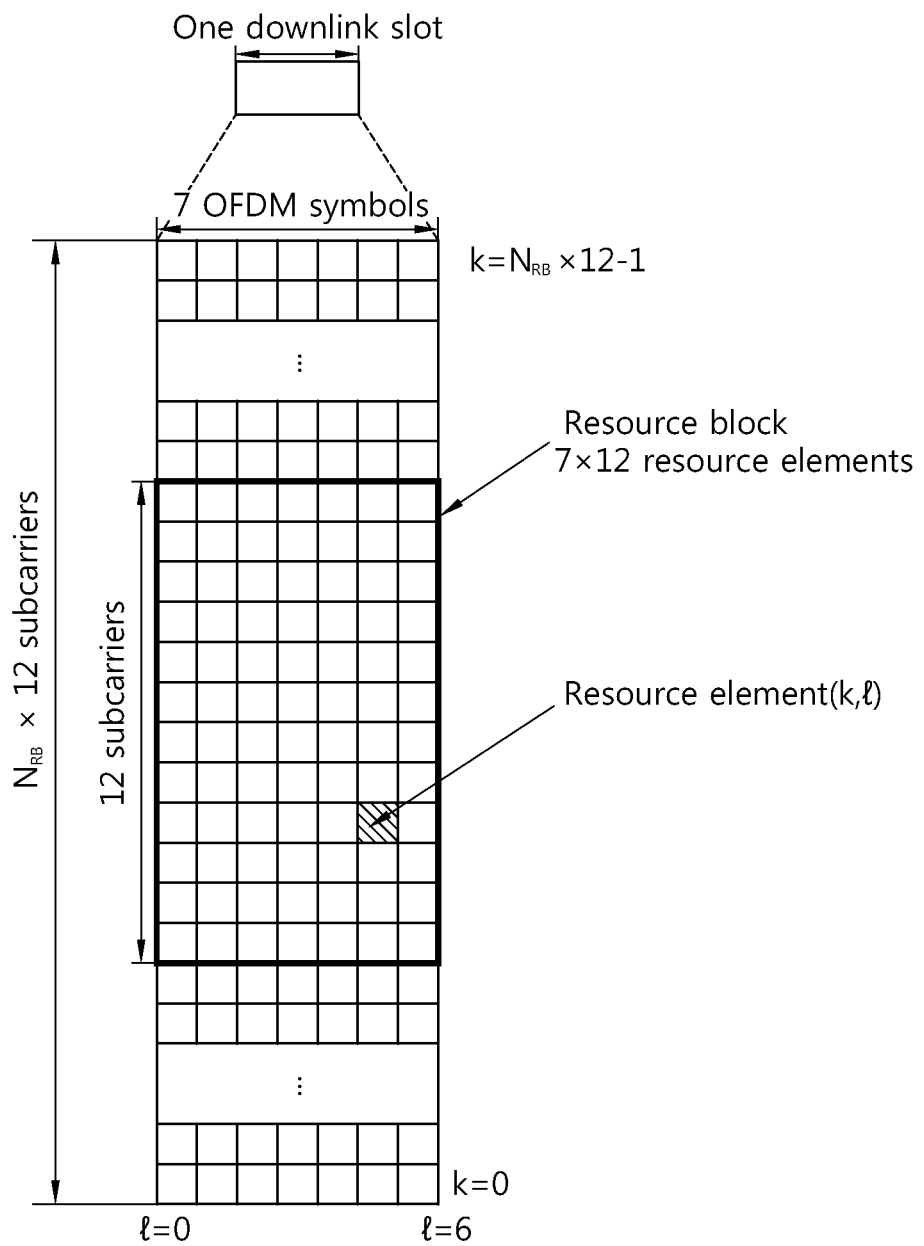
FIG. 3 shows an example of a resource grid for one downlink (DL) slot.

FIG. 3 shows an example of a resource grid for one DL slot.

The DL slot includes a plurality of OFDM symbols in a time domain, and includes $N_{RB}$ resource blocks (RBs) in a frequency domain. The number $N_{RB}$ of RBs included in the DL slot depends on a DL transmission bandwidth determined in a cell. For example, in an LTE system, $N_{RB}$ may be any one value in the range of 60 to 110. One RB includes a plurality of subcarriers in the frequency domain. A UL slot may have the same structure as the DL slot.

Each element on the resource grid is referred to as a resource element (RE). The RE on the resource grid can be identified by an index pair (k, l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. The number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
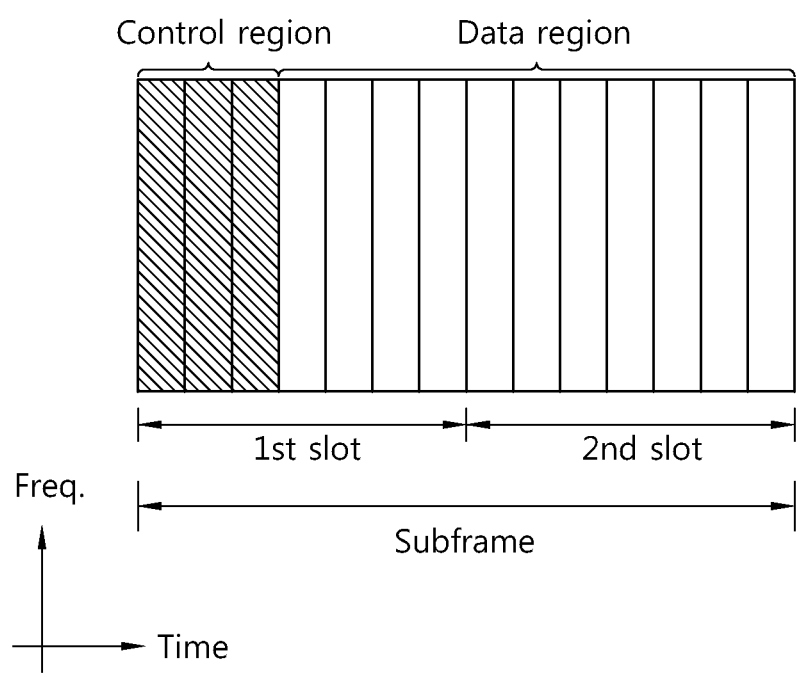
FIG. 4 shows a structure of a DL subframe.

FIG. 4 shows a structure of a DL subframe.

The DL subframe includes two slots in a time domain. Each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region to which control channels are allocated. The remaining OFDM symbols correspond to a data region to which a physical downlink shared channel (PDSCH) is allocated.

The PDCCH can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH described above is referred to as downlink control information (DCI).

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). An REG includes a plurality of resource elements (REs). A format of the PDCCH and the number of bits of the available PDCCH are determined according to a correlation between the number of CCEs and the coding rate provided by the CCEs.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having the DCI of the UE.

FIG. 5 shows a structure of a UL subframe.

The UL subframe can be divided into a control region and a data region. A physical uplink control channel (PUCCH) for carrying UL control information is allocated to the control region. A physical uplink shared channel (PUSCH) for carrying data is allocated to the data region. To maintain a single-carrier property, a UE does not transmit the PUCCH and the PUSCH simultaneously.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In FIG. 5, m is a location index indicating a logical frequency-domain location of the RB pair allocated to the PUCCH in the subframe.

Examples of UL control information transmitted on the PUCCH include a hybrid automatic repeat request (HARQ) acknowledgement (ACK)/non-acknowledgement (NACK) signal, a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a CQI, a precoding matrix indicator (PMI), an HARQ, a rank indicator (RI), etc. The UL data may consist of only control information.

The LTE-A system applies an SC-FDMA transmission scheme in the uplink. A transmission mechanism in which IFFT is performed after DFT spreading is referred to as SC-FDMA. The SC-FDMA can also be referred to as DFT spread-OFDM (DFTs-OFDM). In the SC-FDMA, a peak-to-average power ratio (PAPR) or a cubic metric (CM) can be decreased. When using the SC-FDMA transmission mechanism, a non-linear distortion section of a power amplifier can be avoided, and thus transmit power efficiency can be increased in a UE of which power consumption is limited. Accordingly, a user throughput can be increased.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called a multi-carrier system or a carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE rel-8 UE can transmit or receive only one carrier when each of carriers constituting the carrier aggregation system is compatible with an LTE rel-8 system. Therefore, when the number of carriers used in the uplink is equal to the number of carriers used in the downlink, it is necessary to configure such that all CCs are compatible with the LTE rel-8 system.

In order to efficiently use a plurality of carriers, the plurality of carriers can be managed by media access control (MAC).

Figure 6:
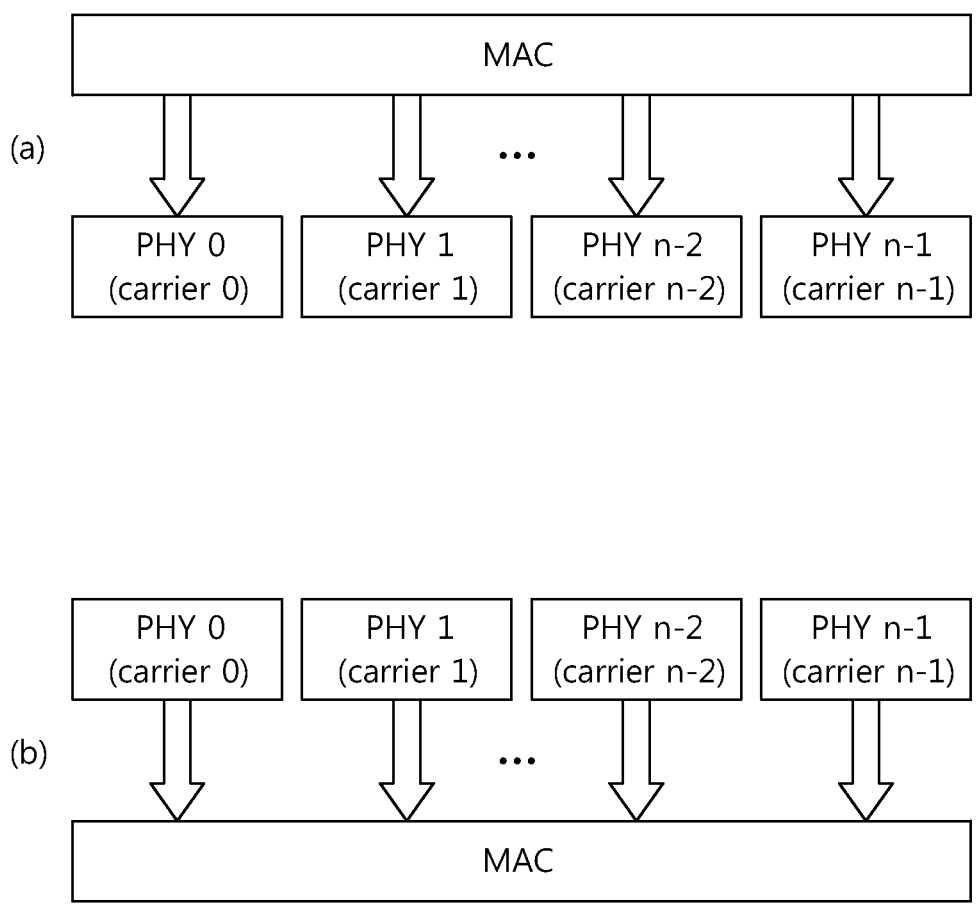
FIG. 6 shows an example of a base station and a user equipment which constitute a carrier aggregation system.

FIG. 6 shows an example of a BS and a UE which constitute a carrier aggregation system.

In the BS of FIG. 6(a), one MAC transmits and receives data by managing and operating all of n carriers. This is also applied to the UE of FIG. 6(b). From the perspective of the UE, one transport block and one HARQ entity may exist per CC. The UE can be scheduled simultaneously for a plurality of carriers. The carrier aggregation system of FIG. 6 can apply both to a contiguous carrier aggregation system and a non-contiguous carrier aggregation system. The respective carriers managed by one MAC do not have to be contiguous to each other, which results flexibility in terms of resource management.

Figure 7:
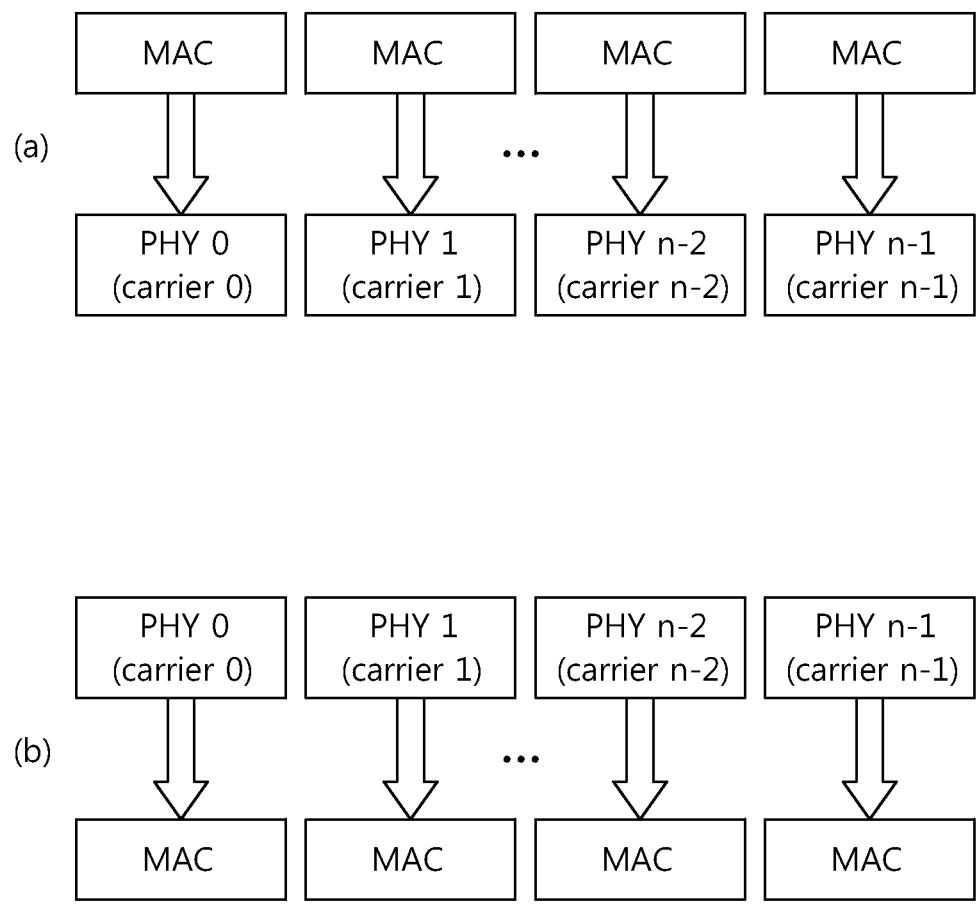

FIG. 7 and FIG. 8 show other examples of a BS and a UE which constitute a carrier aggregation system.

In the BS of FIG. 7(a) and the UE of FIG. 7(b), one MAC manages only one carrier. That is, the MAC and the carrier are 1:1 mapped. In the BS of FIG. 8(a) and the UE of FIG. 8(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to UL and DL transmissions. In a TDD system, each carrier is configured to be able to perform UL transmission and DL transmission. In an FDD system, a plurality of carriers can be used by dividing them for a UL usage and a DL usage. In a typical TDD system, the number of carriers used in UL transmission is equal to that used in DL transmission, and each carrier has the same bandwidth. The FDD system can configure an asymmetric carrier aggregation system by allowing the number of carriers and the bandwidth to be different between UL and DL transmissions.

FIG. 9 shows an example of a DL/UL asymmetric carrier aggregation system to which the present invention is applicable.

FIG. 9(a) shows an example in which the number of DL CCs is greater than the number of UL CCs. FIG. 9(b) shows an example in which the number of UL CCs is greater than the number of DL CCs. Although a case in which two DL CCs are linked to one UL CC is shown in FIG. 9(a) and a case in which one DL CC is linked to two UL CCs is shown in FIG. 9(b), the number of CCs constituting the DL and the UL and a ratio by which the DL CC and the UL CC are linked can change variously depending on a carrier aggregation system to which the present invention is applied, and the content proposed in the present invention is also applicable to a symmetric carrier aggregation system in which a DL CC and a UL CC are 1:1 linked.

A carrier having backward compatibility in an LTE-A system is accessible by the legacy UE by considering compatibility with UEs of the legacy 3GPP LTE system, and may function as one independent carrier or may function as a part of carrier aggregation. The carrier having backward compatibility is always configured in a pair of DL and UL in an FDD system. On the other hand, a carrier not having backward compatibility is newly defined without considering compatibility with UEs that operate in the legacy LTE system, and thus is not accessible by the legacy UE. An extension carrier cannot function as one independent carrier, and is a carrier that functions as a part of a CC set including carriers that can function as one independent carrier.

Cell-specific and UE-specific methods can be taken into account when using one or multiple carriers in a carrier aggregation system. In the following description of the present invention, the cell-specific method implies carrier configuration from the perspective of any cell or BS, and the UE-specific method implies carrier configuration from the perspective of the UE.

The cell-specific carrier aggregation may have a format of a carrier aggregation configured by any BS or cell. In case of the FDD system, the cell-specific carrier aggregation may have a format in which a DL and UL linkage is determined according to the Tx-Rx separation specified in LTE release-8/LTE-A. Detailed descriptions thereof can be found in the section 5.7 of 3GPP TS 36.101 V8.4.0 released in December 2008.

A wireless communication system can support a UL or DL HARQ.

Figure 10:
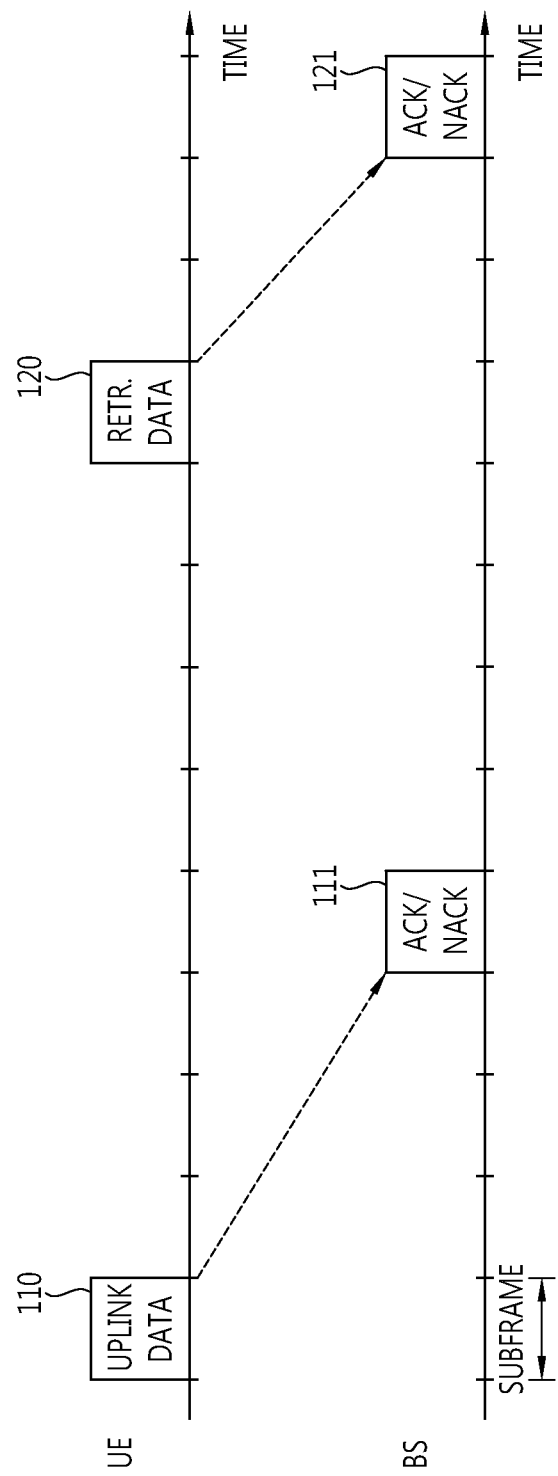
FIG. 10 shows a UL hybrid automatic repeat request (HARQ).

FIG. 10 shows a UL HARQ.

A BS receives UL data 110 from a UE through a PUSCH, and after a specific subframe elapses, transmits an ACK/NACK signal 111 through a PHICH. The ACK/NACK signal 111 corresponds to an ACK signal when the UL data 110 is successfully decoded, and corresponds to a NACK signal when the UL data 110 fails in decoding. Upon receiving the NACK signal, the UE can transmit data retransmission data 120 for the UL data 110 until ACK information is received or until retransmission is performed up to a maximum number of retransmission attempts. The BS can transmit an ACK/NACK signal 121 for the retransmission data 120 through the PHICH.

The following description is about the PHICH.

Figure 11:
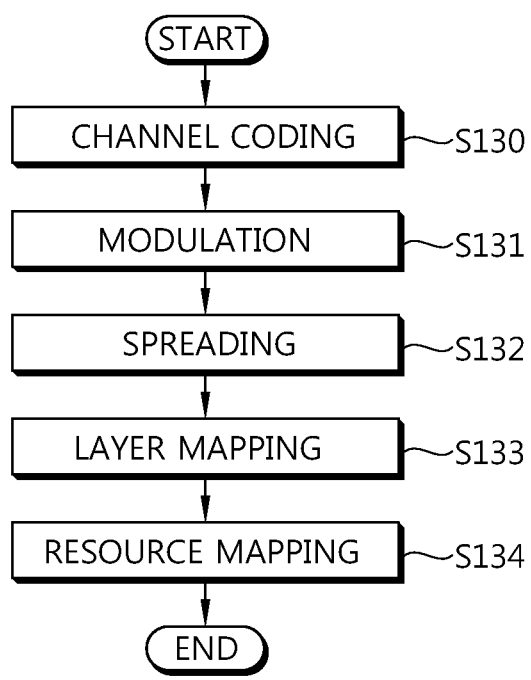
FIG. 11 is a block diagram showing physical hybrid-ARQ indicator channel (PHICH) transmission.

FIG. 11 is a block diagram showing PHICH transmission.

Since an LTE system does not support SU-MIMO in an uplink, one PHICH carries only 1-bit ACK/NACK corresponding to a PUSCH for one UE, that is, corresponding to a single stream. In step S130, the 1-bit ACK/NACK is coded into 3 bits by using a repetition code having a code rate of 1/3. In step S131, the coded ACK/NACK is modulated using binary phase shift keying (BPSK) to generate 3 modulation symbols. In step S132, the modulation symbols are spread by using a spreading factor (SF) of 4 in a normal CP structure and by using an SF of 2 in an extended CP structure. An orthogonal sequence is used when spreading the modulation symbols, and the number of orthogonal sequences used in the spreading is SF×2 to apply I/Q multiplexing. PHICHs which are spread by using SF×2 orthogonal sequences can be defined as one PHICH group. In step S133, layer mapping is performed on the spread symbols. In step S124, the layer-mapped symbols are transmitted by being mapped to resources.

The PHICH carries HARQ ACK/NACK depending on PUSCH transmission. A plurality of PHICHs mapped to resource elements of the same set constitute a PHICH group. Each PHICH in the PHICH group is identified by a different orthogonal sequence. In the FDD system, NPHICH group, i.e., the number of PHICH groups, is constant in all subframes, and can be determined as shown:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 1]}$$

where $N_g$ is transmitted in a higher layer through a physical broadcast channel (PBCH), where $N_g \in \{1/6, 1/2, 1, 2\}$. The PBCH carries essential system information when a UE communicates with a BS. The system information transmitted through the PBCH is called a master information block (MIB). In comparison, system information transmitted through a physical downlink control channel (PDCCH) is called a system information block (SIB). $N_{RB}^{DL}$ denotes a DL bandwidth configuration expressed with a multiple of $N_{SC}^{RB}$ which is an RB size in a frequency domain. A PHICH group index $n_{PHICH}^{group}$ is any one integer from 0 to $N_{PHICH}^{group} - 1$.

A resource used in the PHICH can be determined based on a lowest physical resource block (PRB) index in resource allocation of the PUSCH and a cyclic shift (CS) value of a demodulation reference signal (DMRS) transmitted using a UL grant. A resource to which the PHICH is mapped (hereinafter, a PHICH resource) can be expressed by an index pair $(n_{PHICH}^{group}, n_{PHICH}^{seq})$. Herein, $n_{PHICH}^{group}$ denotes a PHICH group index, and $n_{PHICH}^{seq}$ denotes an orthogonal sequence index in the PHICH group. The index pair $(n_{PHICH}^{group}, n_{PHICH}^{seq})$ can be determined by Equation 2 below.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH} \quad \text{[Equation 2]}$$

The $n_{DMRS}$ can be determined based on a "cyclic shift for DMRS" field in a DCI format 0 according to Table 1.

TABLE 1

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in a case where a PDCCH including the DCI format 0 is not transmitted in the same transport block, $n_{DMRS}$ may be 0 if a first PUSCH is semi-persistently scheduled in the same transport block or if the first PUSCH is scheduled in the same transport block by a random access response grant.

Returning to Equation 2, $N_{SF}^{PHICH}$ denotes a spreading factor (SF) used in PHICH modulation. $I_{PRB\_RA}^{lowest\_index}$ is a lowest PRB index among PRBs of a slot in which a PUSCH corresponding to a PHICH is transmitted. $I_{PHICH}$ has a value of 0 or 1.

An orthogonal sequence used in the PHICH can be determined by Table 2. The orthogonal sequence in use may vary depending on a value $n_{PHICH}^{seq}$ or a CP structure.

TABLE 2

| Sequence Index ($n_{PHICH}^{seq}$) | Orthogonal Sequence | |
|---|---|---|
| | Normal CP ($N_{SF}^{PHICH} = 4$) | Extended CP ($N_{SF}^{PHICH} = 2$) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 12:
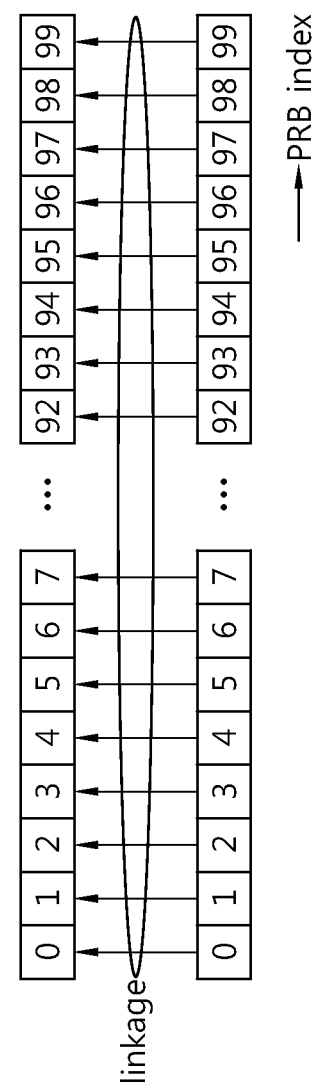
FIG. 12 shows mapping between a physical resource block (PRB) index and a PHICH resource according to the conventional method.

FIG. 12 shows mapping between a PRB index and a PHICH resource according to the conventional method.

A UE identifies a PHICH resource used by a PHICH according to an index pair ($n_{PHICH}^{group}$, $n_{PHICH}^{seq}$) given by Equation 2. Parameters required for determining the index pair are $n_{DMRS}$ and $I_{PRB\_RA}^{lowest\_index}$. In each PUSCH transmission, the PHICH resource can be determined based on a lowest PRB index in a first slot of a corresponding PUSCH.

Assume that there are 100 RBs indexed from 0 to 99. Respective RB indices are 1:1 mapped to PHICH resources. That is, a PHICH resource mapped to a lowest index among indices of RBs used in PUSCH transmission is used among a plurality of PHICH resources. A PHICH resource linked to a lowest RB index among indices of RBs used in transmission of a UL transport block may be used in transmission of an ACK/NACK signal.

The plurality of PHICHs can be simultaneously allocated. In particular, the plurality of PHICHs can be allocated in a system such as a carrier aggregation system, MU-MIMO, a cooperative multi-point (CoMP) transmission scheme, etc. Cross-carrier scheduling may be possible between CCs in the carrier aggregation system.

When the cross-carrier scheduling is used in the carrier aggregation system, a PHICH transmission method in use may be the same as a PHICH transmission method of 3GPP TS 36.211 Release 8. Details thereof can be found in the section 6.9 of 3GPP TS 36.211 Release 8. The PHICH is transmitted through a DL CC used in UL grant transmission. A method specified in 3GPP TS 36.211 Release 8 is used for a resource mapping rule between a DL CC and a UL CC.

In a case where mapping of a DL CC and a UL CC with respect to a UE that operates in an LTE-A system is mapping of a plurality of CCs onto one DL CC, or in a case where cross-carrier scheduling is considered in a DL/UL carrier configuration in which mapping of a DL CC and a UL CC is symmetric (i.e., 1:1 mapping), when using a PHICH resource mapping rule of 3GPP Release 8 described with reference to FIG. 12, a situation in which the same DL resource must be allocated to multiple PHICH transmission may occur. In other words, when resources are allocated for PHICH transmission by using a lowest PRB index and a DM-RS index, there may be a problem in that a plurality of PHICHs are mapped to the same DL resource.

Figure 13:
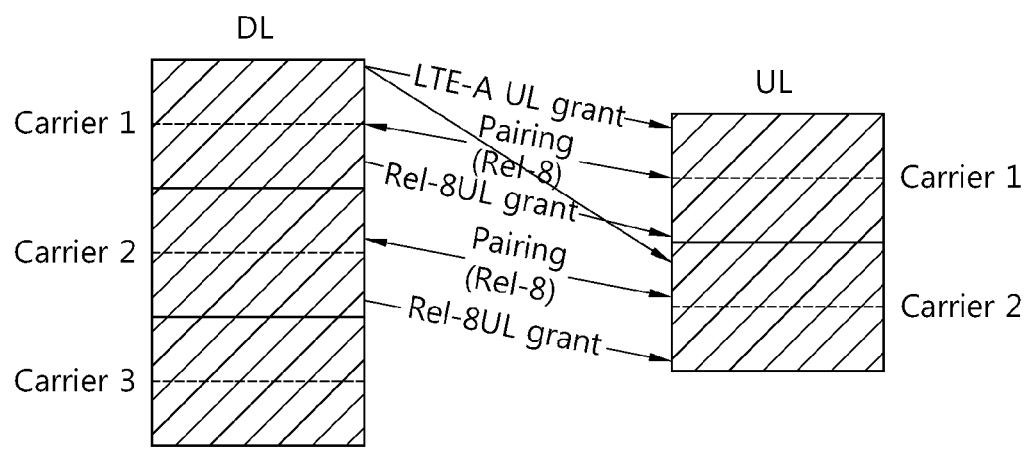
FIG. 13 shows an example of applying cross-carrier scheduling in a carrier aggregation system.

FIG. 13 shows an example of applying cross-carrier scheduling in a carrier aggregation system.

When a UL grant schedules a PUSCH of a UL CC (i.e., a UL carrier 1 and a UL carrier 2) in a DL CC (i.e., a DL carrier 1), in case of following the aforementioned conventional mapping rule between a PRB index and a PHICH resource, PHICH resources for the UL carrier 1 and the UL carrier 2 may be allocated to the same DL resource.

Figure 14:
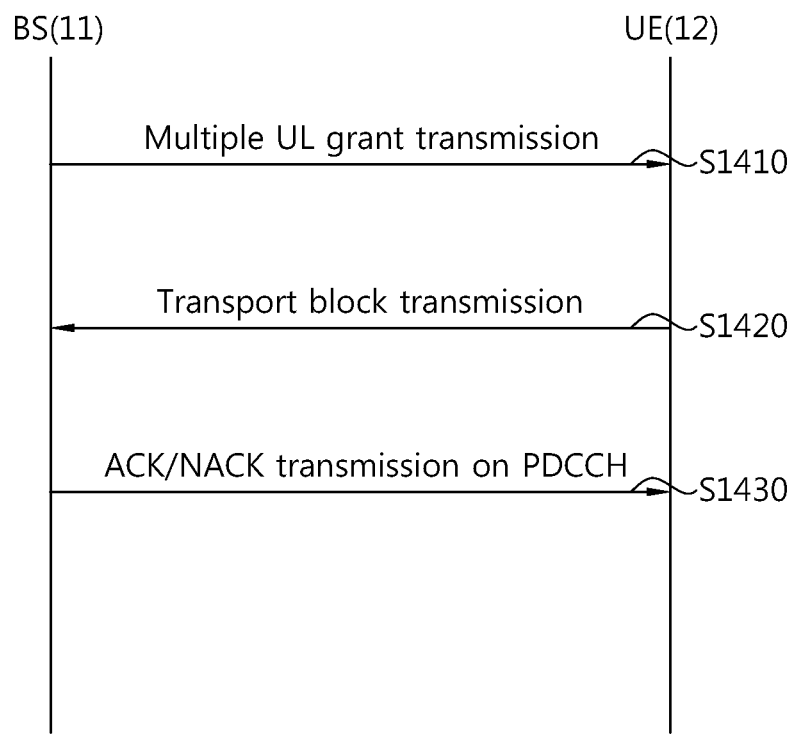
FIG. 14 is a schematic view showing an acknowledgement (ACK)/non-acknowledgement (NACK) transmission method according to an embodiment of the present invention.

FIG. 14 is a schematic view showing an ACK/NACK transmission method according to an embodiment of the present invention.

A BS 11 transmits a plurality of UL grants to a UE 12 (step S1410). The plurality of UL grants may include control information and UL scheduling information for each UL CC. The UE 12 transmits a transport block through a PUSCH allocated using each CC on which the UL grant is received (step S1420). Upon receiving the transport block by using each CC, the BS 11 transmits ACK/NACK in response to the reception of the transport block (step S1430). In this case, DL ACK/NACK of cross-carrier scheduled PUSCH is transmitted through a PDCCH according to an embodiment of the present invention for solving the aforementioned problem. That is, in the example of FIG. 12, in case of a PUSCH in the UL carrier 1, transmission can be achieved by using the conventional PHICH transmission method, and in case of a PUSCH in the UL carrier 2, DL ACK/NACK can be transmitted through the PDCCH. According to embodiments, the conventional method is used for all cases where the number of UL CCs to be subjected to cross-scheduling is less than a specific value N and thus there is a low possibility that the aforementioned PHICH transmission resources are allocated to the same DL resource, whereas if the number of UL CCs to be subjected to cross-scheduling is greater than the specific number N, it can be considered that DL ACK/NACK of a PUSCH to be cross-scheduled is transmitted through a PDCCH. In this case, the specific value N which is used as a criterion for determining the DL ACK/NACK transmission method can be reported to the UE through higher layer signaling.

The PDCCH can be transmitted and received using the same PDCCH transmission and reception process of the conventional 3GPP Release 8. To transmit DL ACK/NACK by using the PUCCH, it is proposed to newly define and use a DCI format.

The newly defined DCI format can be transmitted in the same process as the transmission process defined in the conventional Release 8. A PDCCH having the newly defined DCI format can be multiplexed with another PDCCH through the same PDCCH multiplexing and scrambling process as that specified in the conventional Release 8. Further, the same method of modulation, layer mapping and precoding, and mapping onto a resource element as that used in the conventional Release 8 can also be used.

An information bit included in the new DCI format according to the embodiment of the present invention may be an ACK/NACK bit of a specific PUSCH of a specific UE or a repeated ACK/NACK bit. Alternatively, it may be the entirety or part of a UE index, a carrier index, and a PUSCH index. In another example, it may be 12 complex signal values obtained through a PHICH processing operation specified in the Release 8.

The DCI format newly defined according to the embodiment of the present invention may be UE-specific or cell-specific. If it is defined in a cell-specific manner, ACK/NACK information of several UEs or several PUSCHs to be cross-scheduled can be multiplexed together with each UE/PUSCH index to constitute the newly defined DCI format. A method of indicating an ACK/NACK bit can be determined such that a bit order and a UL carrier index order are equal to each other. One or multiple information can be delivered by pairing the ACK/NACK bit and the carrier index. In this case, the transmitted one or multiple information can indicate both of an ACK/NACK bit and a carrier index which can be combined with each other. The total number of ACK/NACK bits or the number of carriers to be indicated by all ACK/NACKs can be delivered in advance through RRC signaling or can be designated using a UL grant. Alternatively, it can be inferred from carrier aggregation information allocated to the UE.

The following methods can be used when the UE needs to know a DCI format of the ACK/NACK. The UE can know the DCI format of the ACK/NACK implicitly from a carrier configuration. The UE can limit search space for detecting the DCI format of the ACK/NACK as a part of UE-specific search space. That is, the UE can search for only a first CCE region or a second CCE region due to the limitation. The UE can determine whether the ACK/NACK DCI format is detected from the result of PHICH. For example, the ACK/NACK DCI format is detected upon obtaining of information indicating that one or more NACKs are detected from the PHICH. In this case, a PHICH resource used in the detection of the ACK/NACK DCI format can be determined according to a cell-specific linkage. However, it can be a PHICH resource for a UL grant corresponding to a UE-specific UL CC. A BS may not transmit the aforementioned DCI when all ACK/NACK information delivered to a specific UE is ACK.

Figure 15:
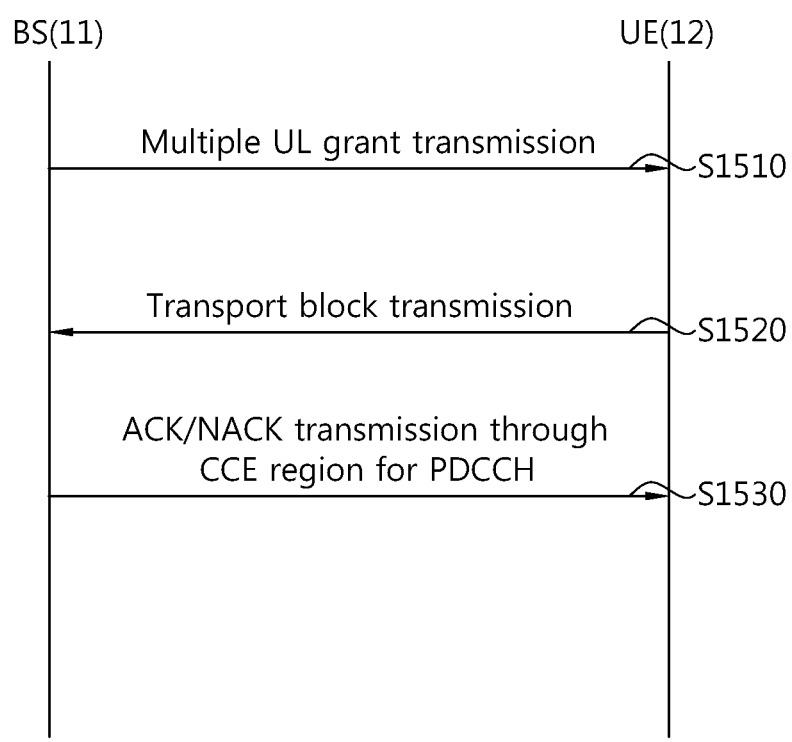
FIG. 15 is a schematic view showing an ACK/NACK transmission method according to another embodiment of the present invention.

FIG. 15 is a schematic view showing an ACK/NACK transmission method according to another embodiment of the present invention.

A BS 11 transmits a plurality of UL grants to a UE 12 (step S1510). The plurality of UL grants may include control information and UL scheduling information for each UL CC. The UE 12 transmits a transport block through a PUSCH allocated using each CC on which the UL grant is received (step S1520). Upon receiving the transport block by using each CC, the BS 11 transmits ACK/NACK in response to the reception of the transport block (step S1530). In this case, DL ACK/NACK can be transmitted through a PHICH allocated to a CCE region for a PDCCH rather than a CCE region for the conventional PHICH. By allocating the PHICH to the CCE region for the PDCCH, a situation where the PHICH of different CCs is allocated to the same resource can be prevented.

A UE which has undergone cross-carrier scheduling and has expected DL ACK/NACK can obtain a PHICH in a CCE region allocated for cross-scheduling. According to embodiments, if the number of UL CCs to be subjected to cross-scheduling is greater than a specific number N, DL ACK/NACK of a PUSCH to be cross-scheduled is transmitted through a PHICH allocated to a CCE region for a PDCCH, whereas if the number of UL CCs to be subjected to cross-scheduling is less than the value N, the conventional PHICH transmission method can be used. The value N can be reported to the UE through higher layer signaling.

According to the embodiment of the present invention, the UE can receive from the BS an index of a CCE, which is allocated to the PHICH received at the CCE index, in advance through higher layer signaling or can obtain it by using a UL grant.

In case of using a CCE of a PDCCH in a cell-specific manner for a PHICH, a CCE index of cell-common search space can be allocated through higher layer signaling. In case of selecting a PHICH resource in a cell-specific manner, a PHICH can be allocated to a region other than cell-common search space. However, this region may be located in a fixed position in every subframe. In addition, a cell-specific PHICH resource can be additionally configured only in a specific subframe. In this case, one or multiple ACK/NACK information can be delivered through one CCE. An ACK/NACK bit configuration can be determined according to an index order of a UL carrier.

Generating of a PHICH in a CCE region for a PDCCH in the embodiment of the present invention can use the same method used in 3GPP Release 8. That is, a method of generating 8 PHICH sequences by performing spreading on 12 resource elements can be used. A resource element selected in this case can be selected from resource element groups that exist in a CCE in use in a logical index order or in a random order, and a PHICH can be generated by grouping three of the selected resource element groups. As a carrier index mapping order for the generated PHICH, a PHICH group can be first mapped, or a PHICH sequence can be first mapped to a carrier index. One or more ACK/NACK bits can be transmitted for UL traffic that uses MIMO.

A channel selection scheme can be applied when transmitting a PHICH sequence used either in a PHICH group or between PHICH groups. That is, a combination of values of UL ACK/NACK bits is represented according to which sequence is used and according to information modulated to a corresponding sequence.

In a method of detecting ACK/NACK information by using a CCE, a UE can detect the CCE after extracting specific information from a cell-specific PHICH. In this case, the specific information may be information indicating existence of one or more NACKs. That is, when existence of one or more NACKs can be known from the BS, ACK/NACK detection can be performed by using the CCE to recognize detailed ACK/NACK information. The BS may not transmit the ACK/NACK information by using the CCE when all of the ACK/NACK information to be transmitted to a specific UE is ACK.

Figure 16:
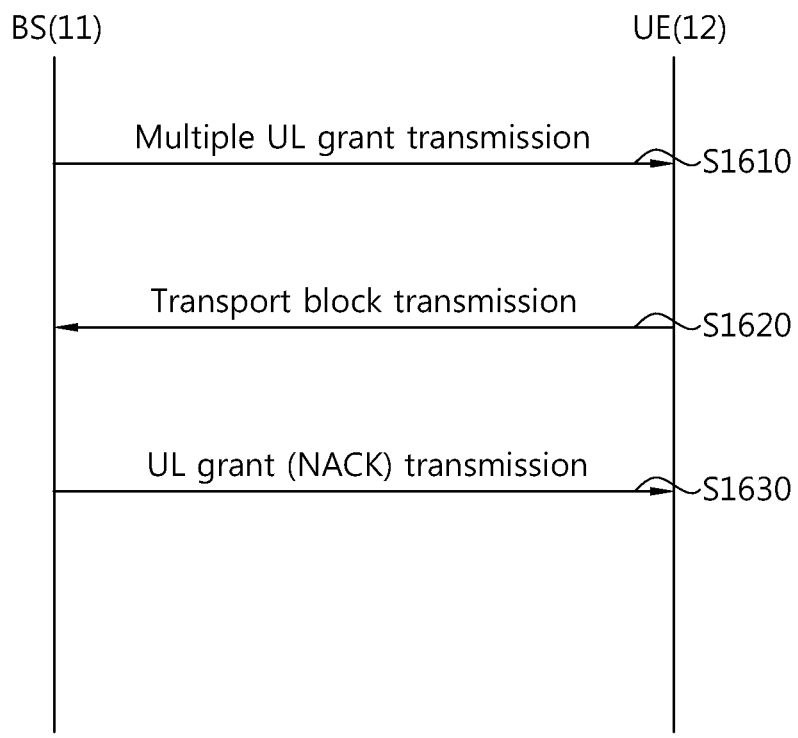
FIG. 16 is a schematic view showing an ACK/NACK transmission method according to another embodiment of the present invention.

FIG. 16 is a schematic view showing an ACK/NACK transmission method according to another embodiment of the present invention.

A BS 11 transmits a plurality of UL grants to a UE 12 (step S1610). The plurality of UL grants may include control information and UL scheduling information for each UL CC. The UE 12 transmits a transport block through a PUSCH allocated using each CC on which the UL grant is received (step S1620). Upon receiving the transport block by using each CC, the BS 11 transmits ACK/NACK in response to the reception of the transport block (step S1630). In this case, DL ACK/NACK can be transmitted by using the UL grant.

When receiving a PUSCH of a UE through cross-carrier scheduling, a UL grant to be transmitted next, rather than a resource for the conventionally defined PHICH, can be used to indicate whether previous transmission through the PUSCH of the UE is successfully received. It is possible to use a method in which a BS uses a UL grant transmitted to a UE, after the UE performs transmission through cross-scheduled CC, to report whether previous transmission of the UE is successfully received in order to solve a problem of overlapping resource allocation for PHICH, which may occur when intending to transmit ACK/NACK for PUSCH transmission on all UL CCs through the conventional PHICH. This method is applicable if the number of UL CCs is greater than or equal to a specific number N, and if the number of UL CCs is less than the specific number N (i.e., if a possibility of occurrence of an overlapping problem in resource allocation for the PHICH is relatively low), the conventional method of ACK/NACK transmission through the PHICH can also be taken into consideration. In this case, the value N used as a reference can be reported to the UE through higher layer signaling.

When transmitting ACK/NACK in response to previous transmission by using a UL grant, ACK/NACK for specific UL traffic can be determined by the UE when a UL grant PDCCH for a UL CC is transmitted to the UE. Cell-specific PHICH and ACK/NACK transmission based on the UL grant can be simultaneously used. In this case, only ACK/NACK for UL traffic to which DL/UL linkage is set can be transmitted through a cell-specific PHICH, and ACK/NACK can be transmitted by using a PDCCH grant as to cross-carrier scheduled traffic.

ACK/NACK bundling can be performed to avoid transmission of a multi-UL grant when transmitting ACK/NACK for multiple UL CCs. In other words, when a UL grant for a specific CC is transmitted or when a UL grant is transmitted without a CC indicator, it can be determined that the UL grant includes bundled ACK/NACK information.

When all ACK/NACK bits to be transmitted correspond to ACK, one UL grant for a specific UL CC or one UL grant without the carrier indicator can indicate that all of the ACK/NACK bits correspond to the ACK. Among ACK/NACK bits to be transmitted, the BS may transmit only UL grants for UL CCs corresponding to NACK and may not transmit the UL grants for UL CCs corresponding to ACK. In this case, the UE can know whether previous transmission is successfully received by the BS according to whether a UL grant is received from the BS through each UL CC.

Figure 17:
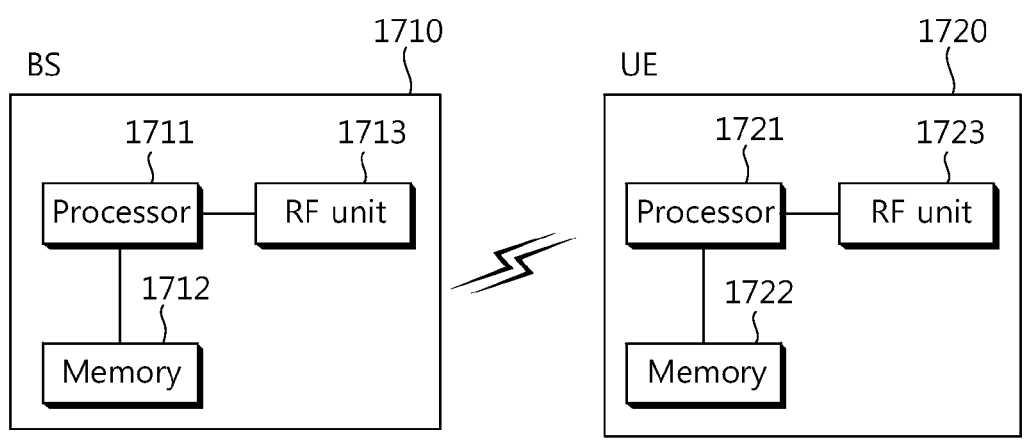
FIG. 17 is a block diagram showing a base station and a user equipment according to an embodiment of the present invention.

FIG. 17 is a block diagram showing a BS and a UE according to an embodiment of the present invention.

A BS 1710 includes a processor 1711 and an RF unit 1713. A UE 1720 includes a processor 1721 and an RF unit 1723. The RF units 1713 and 1723 are operationally coupled to the processors 1171 and 1721, respectively. The RF units 1713 and 1723 transmit/receive transport blocks through a plurality of PUSCHs by using the entirety or part of multiple carriers, and transmit/receive ACK/NACK in response to transmission/reception of the respective transport blocks through carriers on which the respective PUSCHs are transmitted. The processors 1711 and 1721 are configured to be able to implement operations of the BS and the UE according to the aforementioned embodiments of the present invention descried with reference to FIG. 14 to FIG. 16.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of performing a hybrid automatic repeat request (HARQ) by a user equipment in a wireless communication system, the user equipment capable of capable of aggregating a plurality of downlink component carriers and aggregating a plurality of uplink component carriers, the method comprising:

receiving, by a user equipment from a base station via a first downlink component carrier, a first uplink grant for a first uplink component carrier, and a second uplink grant for a first second component carrier;

transmitting, by the user equipment to the base station based on the first and second uplink grant, a first physical uplink shared channel (PUSCH) via the first uplink component carrier and a second PUSCH via the second uplink component carrier;

receiving, by the user equipment from the base station, a first ACK/NACK with respect to the first PUSCH and a second ACK/NACK with respect to the second PUSCH, wherein, if a number of the aggregated uplink component carriers is greater than a number of the aggregated downlink component carriers, if the second uplink grant for the second uplink component carriers is received via the first downlink component carrier and if a physical hybrid automatic repeat request indicator channel (PHICH) is not enough to include the ACK/NACK signals, the first ACK/NACK signal is received on the PHICH while the second ACK/NACK signal is received on a physical downlink control channel (PDCCH).

2. The method of claim 1, wherein, when the first and second PUSCH are transmitted in a subframe n, the ACK/NACK signals are received in a subframe n+4.

3. The method of claim 1, further comprising:

receiving, by the user equipment, a carrier configuration from the base station, the carrier configuration comprising the plurality of downlink component carriers and the plurality of uplink component carriers.

4. The method of claim 3, wherein the carrier configuration is user-equipment specific information.

5. A user equipment performing a hybrid automatic repeat request (HARQ) in a wireless communication system, the user equipment comprising:

a radio frequency unit capable of aggregating a plurality of downlink component carriers and aggregating a plurality of uplink component carriers and configured to transmit and receive radio signals; and a processor operatively coupled with the radio frequency unit and configured to:

receive, from a base station via a first downlink component carrier, a first uplink grant for a first uplink component carrier, and a second uplink grant for a first second component carrier;

transmit, to the base station based on the first and second uplink grant, a first physical uplink shared channel (PUSCH) via the first uplink component carrier and a second PUSCH via the second uplink component carrier;

receive, from the base station, a first ACK/NACK with respect to the first PUSCH and a second ACK/NACK with respect to the second PUSCH, wherein, if a number of the aggregated uplink component carriers is greater than a number of the aggregated downlink component carriers, if the second uplink grant for the second uplink component carriers is received via the first downlink component carrier and if a physical hybrid automatic repeat request indicator channel (PHICH) is not enough to include the ACK/NACK signals, the first ACK/NACK signal is received on the PHICH while the second ACK/NACK signal is received on a physical downlink control channel (PDCCH).

6. The user equipment of claim 5, wherein when the first and second PUSCH are transmitted in a subframe n, the ACK/NACK signals are received in a subframe n+4.

7. The user equipment of claim 5, wherein the processor is further configured to receive a carrier configuration from the base station, the carrier configuration comprising the plurality of downlink component carriers and the plurality of uplink component carriers.

8. The user equipment of claim 7, wherein the carrier configuration is user-equipment specific information.

9. The method of claim 1, wherein the second ACK/NACK signal is received on control channel elements (CCEs) of the PDCCH.

10. The user equipment of claim 5, wherein the second ACK/NACK signal is received on control channel elements (CCEs) of the PDCCH.

* * * * *